(12) United States Patent
Wang et al.

(10) Patent No.: US 10,324,344 B2
(45) Date of Patent: Jun. 18, 2019

(54) LIQUID CRYSTAL DISPLAY PANEL, DRIVING CIRCUIT AND MANUFACTURING METHOD OF THE SAME

(71) Applicants: Shenzhen China Star Optoelectronics Technology Co., Ltd., Shenzhen (CN); Wuhan China Star Optoelectronics Technology Co., Ltd., Wuhan (CN)

(72) Inventors: Cong Wang, Shenzhen (CN); Peng Du, Shenzhen (CN)

(73) Assignees: Shenzhen China Star Optoelectronics Technology Co., Ltd., Shenzhen (CN); Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/231,633

(22) Filed: Dec. 24, 2018

(65) Prior Publication Data

US 2019/0129261 A1    May 2, 2019

Related U.S. Application Data

(62) Division of application No. 14/897,624, filed on Dec. 10, 2015, now Pat. No. 10,203,574.

(30) Foreign Application Priority Data

Sep. 8, 2015   (CN) .......................... 2015 1 0568306

(51) Int. Cl.
  *H01L 27/12*    (2006.01)
  *G02F 1/1362*   (2006.01)
  (Continued)

(52) U.S. Cl.
  CPC ...... *G02F 1/136204* (2013.01); *G02F 1/1303* (2013.01); *G02F 1/13452* (2013.01);
  (Continued)

(58) Field of Classification Search
  CPC .......... H01L 21/0274; H01L 21/32139; H01L 21/47635; H01L 21/76259; H01L 27/124;
  (Continued)

(56) References Cited

U.S. PATENT DOCUMENTS

2005/0041002 A1* 2/2005 Takahara ............ H01L 27/1255
  345/76
2019/0108791 A1* 4/2019 Takahara .............. H01L 27/124

* cited by examiner

*Primary Examiner* — Cuong Q Nguyen (57) ABSTRACT

A liquid crystal display panel and its driving circuit, manufacturing method are disclosed. The driving circuit has a first switching element. The first terminal of the first switching element is connected to one data line of the liquid crystal display panel. At the array manufacturing process stage, the control terminal of the first switching element is input a first reference voltage. The second terminal of the first switching element is connected to a first discharge circuit. During the stage to drive the liquid crystal display panel to display or to test the liquid crystal display panel, the control terminal of the first switching element is input a first control signal. The second terminal of the first switching element is input a data signal. By the aforementioned ways, it can simultaneously achieve an ESD protection and to save the panel space to be favorable for narrow frame design.

5 Claims, 6 Drawing Sheets

(51) Int. Cl.
   *G02F 1/1345*   (2006.01)
   *G02F 1/13*   (2006.01)
   *G09G 3/36*   (2006.01)
   *G02F 1/1368*   (2006.01)
   *G09G 3/00*   (2006.01)

(52) U.S. Cl.
   CPC ..... *G02F 1/136286* (2013.01); *G09G 3/3648* (2013.01); *G02F 1/1368* (2013.01); *G02F 2001/136254* (2013.01); *G02F 2001/136295* (2013.01); *G02F 2201/503* (2013.01); *G02F 2202/104* (2013.01); *G09G 3/006* (2013.01); *G09G 3/3607* (2013.01); *G09G 2310/0297* (2013.01); *G09G 2330/12* (2013.01)

(58) Field of Classification Search
   CPC ............. H01L 27/1251; H01L 27/1255; H01L 27/14641
   See application file for complete search history.

LIQUID CRYSTAL DISPLAY PANEL, DRIVING CIRCUIT AND MANUFACTURING METHOD OF THE SAME

CROSS-REFERENCE TO RELATED APPLICATIONS

This is a divisional application of co-pending U.S. patent application Ser. No. 14/897,624, filed on Dec. 10, 2015, which is a national stage of PCT Application No. PCT/CN2015/090491, filed on Sep. 24, 2015, claiming foreign priority of Chinese Patent Application No. 201510568306.1, filed on Sep. 8, 2015.

BACKGROUND OF THE INVENTION

Field of the Invention

The present invention relates to a technical field of a liquid crystal display (LCD), especially to an LCD panel, its driving circuit and manufacturing method.

Description of Related Art

During the manufacturing process of the LCD panels, especially the array process, dry etching procedure needs to be processed multiple times. However, during the dry etching procedure, large amounts of static electricity are easily produced. Therefore, electrostatic discharge protection (ESD protection) is designed in the panel to keep the panel from accumulating too much static electricity to cause the wire explosion.

Figure 1:
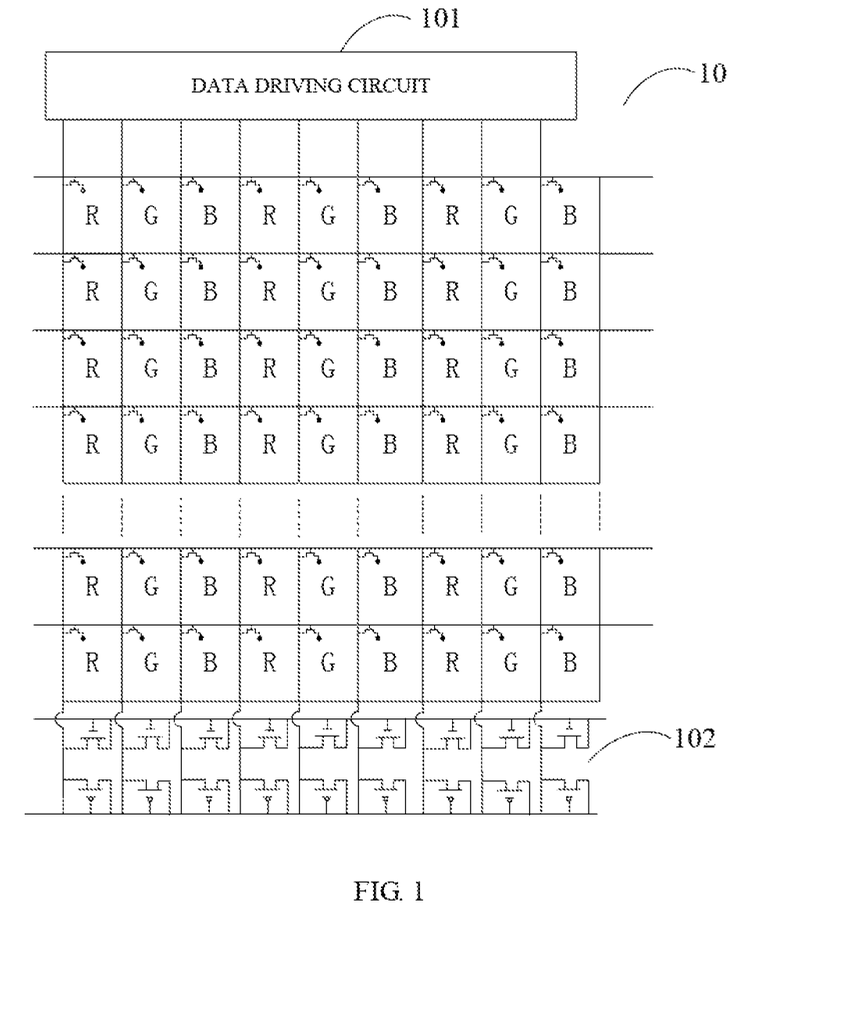
FIG. 1 is an illustrative view of an LCD panel with an ESD protection structure in accordance with the prior art.

As shown in FIG. 1, a conventional ESD protection configuration has a ESD protection structure 102 formed on an opposite side of a data driving circuit 101 of the LCD panel 10. However, the static electricity is usually generated during the dry etching procedure. When the array manufacturing process is finished, the ESD protection structure 102 on the opposite side of the data driving circuit 101 no longer plays a role but still exists after assembling as a module. Therefore, the space of the frame is occupied by the ESD protection structure and the ESD protection structure is not conducive to the narrow frame design for the panel.

SUMMARY OF THE INVENTION

The main technology problem solved by the present invention is to provide a liquid crystal panel and its driving circuit and manufacturing method so that the space in the panel is save to achieve narrow frame design of the LCD panel while achieving ESD protection.

In order to solve the above technology problem, the present invention provides a technical solution that is driving circuit of an LCD panel. The LCD panel is a low temperature poly-silicon LCD panel. The circuit comprises multiple first switching circuits. Each first switching circuit has a first element and a second switching element. The first switching element and the second switching element respectively have a control terminal, a first terminal and a second terminal. The first terminals of the first switching element and the second switching element are connected to the same data line of the LCD panel. At the array manufacturing process stage of the LCD panel, the control terminals of the first switching element and the second switching element are used respectively to be input by the first reference voltage and the second reference voltage. The second terminals of the first switching element and the second switching element are respectively connected to a first discharge circuit and a second discharge circuit. When the voltage of the data line is lower than the first reference voltage, the first switching element is turned on to discharge the voltage of the data line through the first discharge circuit. When the voltage of the data line is higher than the second reference voltage, the second switching element is turned on to discharge the voltage of the data line through the second discharge circuit. During the stage to drive the LCD panel to display or to test the LCD panel, the control terminal of at least one of the first switching element and the second switching element is input a first control signal, and the second terminal of at least one of the first switching element and the second switching element is input by a data signal. Thus, when the first control signal controls at least one of the first switching element and the second switching element to be turned on, the data signal passes through said switching element to be transmitted to the data line so that the LCD panel is achieved to display or to be tested.

It further comprises multiple second switching circuits. Each second switching circuit has a third switching element and a fourth switching element. Each second switching circuit corresponds to at least two of the first switching circuits. The second terminals of the first switching element of the at least two of the first switching circuits are connected to the first discharge circuit or to receive the data signal through the third switching element. The second terminals of the second switching element of the at least two of the first switching circuits are connected to the second discharge circuit or to receive the data signal through the fourth switching element. The third switching element and fourth switching element respectively have a control terminal, a first terminal and a second terminal. The first terminal of the third switching element is connected to the second terminals of the first switching elements of the corresponding at least two of the first switching circuits. The first terminal of the fourth switching element is connected to the second terminals of the second switching elements of the corresponding at least two of the first switching circuits. At the array manufacturing process stage of the LCD panel, the control terminals of the third switching element and the fourth switching element are used respectively to be input by the first reference voltage and the second reference voltage. The first terminals of the third switching element and the fourth switching element are respectively connected to the first discharge circuit and the second discharge circuit. When the voltage of the data line connected by one of the corresponding first switching circuits is lower than the first reference voltage, the third switching element is turned on to discharge the voltage of the data line connected by the one of the corresponding first switching circuits through the first discharge circuit. When the voltage of the data line connected by one of the corresponding first switching circuits is higher than the second reference voltage, the fourth switching element is turned on to discharge the voltage of the data line connected by one of the corresponding first switching circuits through the second discharge circuit. During the stage to drive the LCD panel to display or to test the LCD panel, the control terminal of at least one of the third switching element and the fourth switching element is input by a second control signal, and the second terminal of at least one of the third switching element and the fourth switching element is input by the data signal. Thus, the data signal is input to the second terminal of at least one of the first switching element and the second switching element of the at least two of the first switching circuits.

The first reference voltage and the second voltage are ground voltage. The first discharge circuit and the second discharge circuit are short-circuit lines connected to the ground. At the array manufacturing process stage, the control terminals of the first switching elements, the second switching elements, the third switching elements and the fourth switching elements are all connected to the short-circuit lines. The first terminals of the third switching element and the fourth switching element of each second switching circuit are connected to the second terminals of the first switching elements and the second switching elements of the corresponding at least two of the first switching circuits. During the stage to drive the LCD panel to display or to test the LCD panel, the short-circuit lines are cut. Then the first control signal is input to the control terminal of at least one of the first switching element and the second switching element of each first switching circuit. The second control signal is input to the control terminal of at least one of the third switching element and the fourth switching element of each second switching circuit. The data signal is input to the second terminal of at least one of the third switching element and the fourth switching element of each second switching circuit.

The first switching elements and the third switching elements are N-type thin-film transistors. The second switching elements and the fourth switching elements are P-type thin-film transistors. The gate, source and drain are respectively regarded as the control terminal, the first terminal and the second terminal of each switching element.

In order to solve the above technology problem, the present invention provides another technical solution that is an LCD panel. The LCD panel comprises a driving circuit. The driving circuit comprises multiple first switching circuits. Each first switching circuit has a first switching element. The first switching element has a control terminal, a first terminal and a second terminal. The first terminal of the first switching element is connected to one data line of the LCD panel. At the array manufacturing process stage, the control terminal of the first switching element is used respectively to be input by the first reference voltage. The second terminal of the first switching element is connected to a first discharge circuit. When the voltage of the data line is higher than or lower than the first reference voltage, the first switching element is turned on to discharge the voltage of the data line through the first discharge circuit. During the stage to drive the LCD panel to display or to test the LCD panel, the control terminal of the first switching element is input by a first control signal, and the second terminal of the first switching element is input by a data signal. Thus, when the first control signal controls the first switching element to be turned on, the data signal passes through said first switching element to be transmitted to the data line so that the LCD panel is achieved to display or to be tested.

Each first switching circuit has a second switching element. The second switching element has a control terminal, a first terminal and a second terminal. The first terminals of the first switching element and the second switching element are connected to the same data line of the LCD panel. At the array manufacturing process stage, the control terminals of the first switching element and the second switching element are used respectively to be input by the first reference voltage and the second reference voltage. The second terminals of the first switching element and the second switching element are respectively connected to the first discharge circuit and a second discharge circuit. When the voltage of the data line is lower than the first reference voltage, the first switching element is turned on to discharge the voltage of the data line through the first discharge circuit. When the voltage of the data line is higher than the second reference voltage, the second switching element is turned on to discharge the voltage of the data line through the second discharge circuit. During the stage to drive the LCD panel to display or to test the LCD panel, the control terminal of at least one of the first switching element and the second switching element is input by a first control signal, and the second terminal of at least one of the first switching element and the second switching element is input by a data signal. Thus, the LCD panel is achieved to display or to be tested.

It further comprises multiple second switching circuits. Each second switching circuit has a third switching element and a fourth switching element. Each second switching circuit corresponds to at least two of the first switching circuits. The second terminals of the first switching element of the at least two of the first switching circuits are connected to the first discharge circuit or to receive the data signal through the third switching element. The second terminals of the second switching element of the at least two of the first switching circuits are connected to the second discharge circuit or to receive the data signal through the fourth switching element. The third switching element and fourth switching element respectively have a control terminal, a first terminal and a second terminal. The first terminal of the third switching element is connected to the second terminals of the first switching elements of the corresponding at least two of the first switching circuits. The first terminal of the fourth switching element is connected to the second terminals of the second switching elements of the corresponding at least two of the first switching circuits. At the array manufacturing process stage of the LCD panel, the control terminals of the third switching element and the fourth switching element are used respectively to be input by the first reference voltage and the second reference voltage. The first terminals of the third switching element and the fourth switching element are respectively connected to the first discharge circuit and the second discharge circuit. When the voltage of the data line connected by one of the corresponding first switching circuits is lower than the first reference voltage, the third switching element is turned on to discharge the voltage of the data line connected by the one of the corresponding first switching circuits through the first discharge circuit. When the voltage of the data line connected by one of the corresponding first switching circuits is higher than the second reference voltage, the fourth switching element is turned on to discharge the voltage of the data line connected by one of the corresponding first switching circuits through the second discharge circuit. During the stage to drive the LCD panel to display or to test the LCD panel, the control terminal of at least one of the third switching element and the fourth switching element is input by a second control signal, and the second terminal of at least one of the third switching element and the fourth switching element is input by the data signal. Thus, the data signal is input to the second terminal of at least one of the first switching element and the second switching element of the at least two of the first switching circuits.

The first reference voltage and the second voltage are ground voltage. The first discharge circuit and the second discharge circuit are short-circuit lines connected to the ground. At the array manufacturing process stage of the LCD panel, the control terminals of the first switching elements, the second switching elements, the third switching elements and the fourth switching elements are all connected to the short-circuit lines. The first terminals of the third switching element and the fourth switching element of each second switching circuit are connected to the second terminals of the first switching elements and the second switching elements of the corresponding at least two of the first switching circuits. During the stage to drive the LCD panel to display or to test the LCD panel, the short-circuit lines are cut. Then the first control signal is input to the control terminal of at least one of the first switching element and the second switching element of each first switching circuit. The second control signal is input to the control terminal of at least one of the third switching element and the fourth switching element of each second switching circuit. The data signal is input to the second terminal of at least one of the third switching element and the fourth switching element of each second switching circuit.

The first switching elements and the third switching elements are N-type thin-film transistors. The second switching elements and the fourth switching elements are P-type thin-film transistors. The gate, source and drain are respectively regarded as the control terminal, the first terminal and the second terminal of each switching element.

In order to solve the above technology problem, the present invention provides another technical solution that is a manufacturing method of an LCD panel comprising following steps. A driving circuit of the LCD panel is formed. The driving circuit comprises multiple first switching circuits. Each first switching circuit has a first switching element. The first switching element has a control terminal, a first terminal and a second terminal. The first terminal of the first switching element is connected to one data line of the LCD panel. At the array manufacturing process stage of the LCD panel, input the first reference voltage into the control terminal of the first switching element. The second terminal of the first switching element is connected to a first discharge circuit. When the voltage of the data line is higher than or lower than the first reference voltage, the first switching element is turned on to discharge the voltage of the data line through the first discharge circuit. After the array manufacturing process stage, the stage to drive the LCD panel to display or to test the LCD panel is processed to disconnect the second terminal of the first switching element and the first discharge circuit. Then the control terminal of the first switching element is input by a first control signal, and the second terminal of the first switching element is input by a data signal. Thus, when the first control signal controls the first switching element to be turned on, the data signal passes through said first switching element to be transmitted to the data line so that the LCD panel is achieved to display or to be tested.

The manufacturing method of an LCD panel comprises following steps. The driving circuit of the LCD panel is formed. The driving circuit has multiple second switching elements. The second switching element has a control terminal, a first terminal and a second terminal. The first terminals of the first switching element and the second switching element are connected to the same data line of the LCD panel. At the array manufacturing process stage of the LCD panel further comprises following steps. The control terminal of the second switching element is input by the second reference voltage. The second terminal of the second switching element is connected to a second discharge circuit. When the voltage of the data line is higher than the second reference voltage, the second switching element is turned on to discharge the voltage of the data line through the second discharge circuit. When the voltage of the data line is lower than the first reference voltage, the first switching element is turned on. After the array manufacturing process stage, the stage to drive the LCD panel to display or to test the LCD panel is processed and comprises following steps. The first switching element and the second switching element are disconnected respectively to the first discharge circuit and the second discharge circuit. The control terminal of at least one of the first switching element and the second switching element is input by a first control signal, and the second terminal of at least one of the first switching element and the second switching element is input by a data signal. Thus, the LCD panel is achieved to display.

The beneficial effect of the present invention is: to distinguish with the prior arts, the driving circuit of the present invention during the array manufacturing process stage of the LCD panel has the data line connected to the first discharge circuit through the first switching element to discharge the electric charges of the data line through the first discharge circuit so that the static electricity of the data line is discharged. During the stage to drive the LCD panel to display or to test the LCD, the data signal is input to the data line through the first switching element to achieve the LCD panel to display or to be tested. By the aforementioned ways, the first switching element is used simultaneously to proceed an ESD protection and to drive the panel to display or to be tested. Therefore, extra panel space is not needed or only a small panel space is needed to form the ESD protection structure. Then the panel space is reduced to be favorable for narrow frame design.

DETAILED DESCRIPTION OF THE PREFERRED EMBODIMENT

The present invention is detailed described as following with the figures and embodiments.

Figure 2:
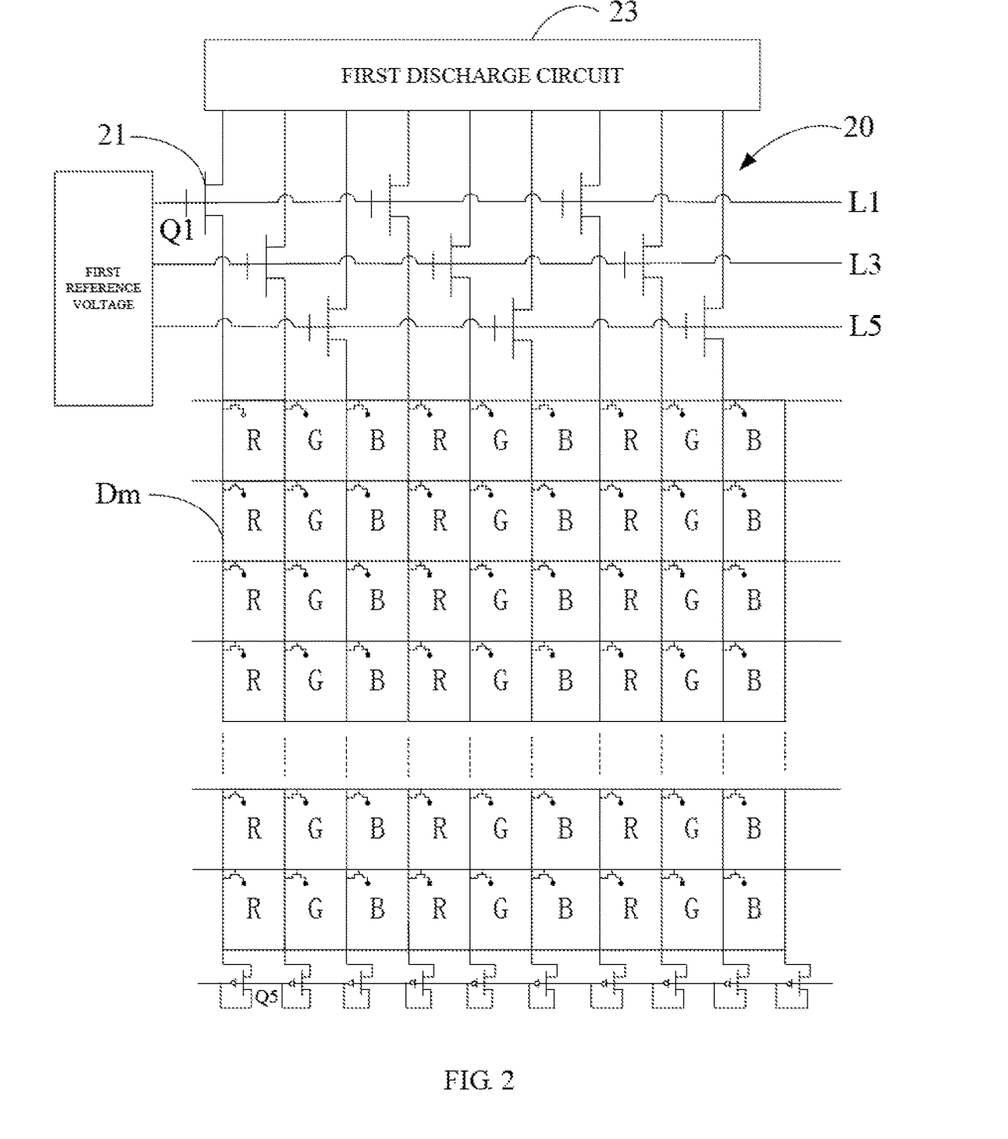
FIG. 2 is an illustrative view of the connecting structure of an embodiment of a driving circuit of an LCD panel in accordance with the present invention, shown that to achieve to discharge the static electricity of the data line at the array manufacturing process stage.
Figure 3:
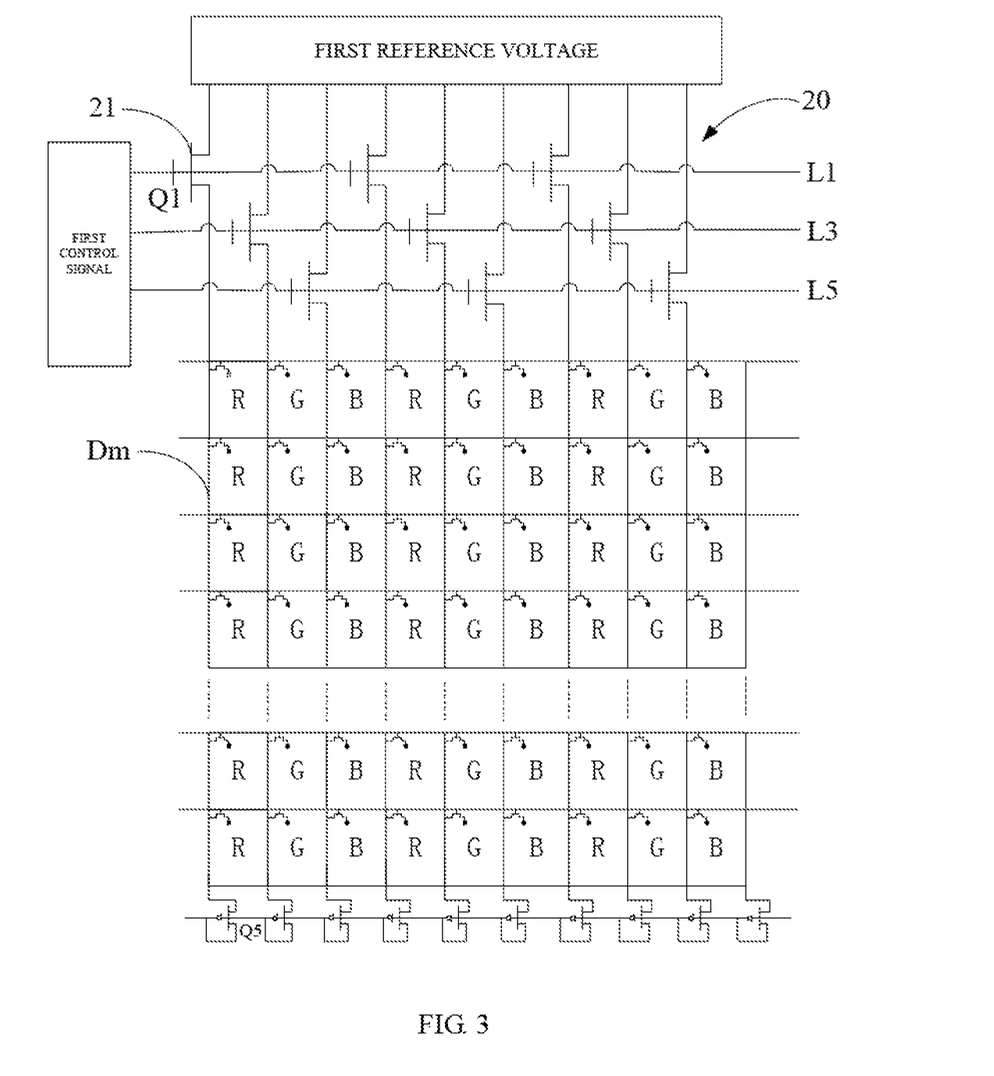
FIG. 3 is an illustrative view of the connecting structure of an embodiment of a driving circuit of an LCD panel in accordance with the present invention, shown that to achieve to drive the data line at the stage to drive the LCD panel to display or to test the LCD panel.

With reference to FIGS. 2 and 3, in one embodiment of a driving circuit of an LCD panel in accordance with present invention, the LCD panel is a low temperature poly-silicon (LTPS) LCD panel having multiple pixels. The pixels are arranged along row direction in multiple R sub-pixel columns, G sub-pixel columns and B sub-pixel columns periodically in sequence. An R sub-pixel, a G sub-pixel and a B sub-pixel constitute a pixel unit. Each sub-pixel column corresponds to one data line Dm, i.e. the multiple sub-pixels in each sub-pixel column connecting to one data line Dm. The driving circuit 20 comprises multiple first switching circuits 21 and three control lines L1, L3, L5. Each switching circuit 21 comprises a first switching element Q1. Certainly, the LCD panel may be an amorphous silicon LCD panel.

The first switching element Q1 has a control terminal, a first terminal and a second terminal. The first terminal of the first switching element Q1 connects to one data line Dm of the LCD panel, i.e. each data line Dm corresponding to one first switching element Q1. The control terminals of the first switching elements. Q1 corresponding to the sub-pixel columns having the same color connect to the same one of the control lines. For example, the control terminals of the first switching elements Q1 corresponding to the R sub-pixel columns connect to the control line L1. The control terminals of the first switching elements Q1 corresponding to the G sub-pixel columns connect to the control line L3. The control terminals of the first switching elements Q1 corresponding to the B sub-pixel columns connect to the control line L5.

With reference to FIG. 2, at the array manufacturing process stage of the LCD panel, the control terminals of the first switching elements Q1 of the first switching circuits 21 are used to be input by a first reference voltage. The first reference voltage is input through the three control lines L1, L3, L5 to the control terminals of the first switching elements Q1. The first reference voltage may be ground voltage or predetermined value such as +0.5 v or +1 v. The second terminal of the first switching element Q1 is connected to a first discharge circuit 23.

The first switching elements Q1 are N-type thin-film transistors. The gate, source and drain of the first switching element Q1 are respectively regarded as the control terminal, the first terminal and the second terminal of the first switching element Q1. Therefore, during the dry-etching process at the array manufacturing process stage, when the data line Dm accumulates a large amount of negative static electricity i.e. the data line Dm accumulates much more negative charges until the voltage (negative voltage) of the data line Dm is lower than the first reference voltage, the gate voltage Vgs (gate voltage-source voltage is larger than zero and the first switching element Q1 is turned on. Then the data line Dm and the first discharge circuit 23 are connected so that the accumulated negative charges on the data line Dm are discharged through the first discharge circuit 23 to achieve ESD protection. The first discharge circuit 23 may be a ground resistance, a ground line or a lead with positive charges.

Figure 4:
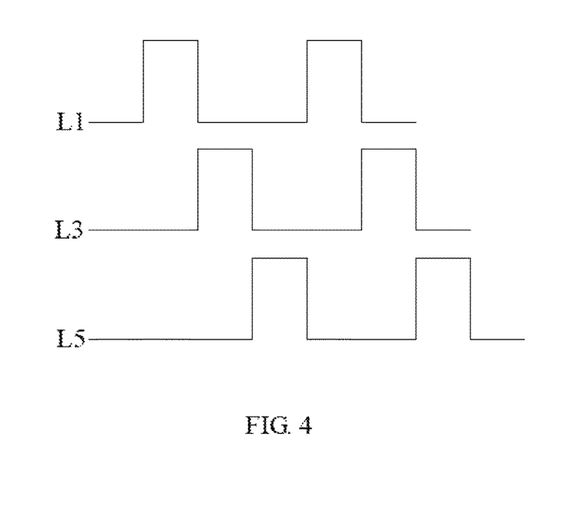
FIG. 4 is a time sequence waveform diagram of a first control signal of an embodiment of a driving circuit of an LCD panel in accordance with the present invention at the stage to drive the LCD panel to display or to test the LCD panel.

With reference to FIG. 3, after the array manufacturing process, a cell manufacturing process is entered. At the cell manufacturing process stage, the LCD panel is usually driven or tested. However, the static electricity is not easily accumulated on the data line Dm at this stage so that the data line needs not to be proceed ESD protection. Therefore, the first switching element Q1 and the first discharge circuit 23 can be disconnected such as cutting the first discharge circuit 23. When the LCD panel is driven to display or to test if the data line is operable or not, the control terminals of the first switching elements Q1 are input by a first control signal. Specifically, the first control signal is input to the control terminals of the first switching elements Q1 through the control lines L1, L3, L5 to respectively control the corresponding first switching element Q1 to be turned on or off. The waveform diagram shown when the control lines L1, L3, L5 receiving the first control signal is shown in FIG. 4. When the control terminals of the first switching element Q1 are input the control signal of high voltage level, the first switching element Q1 is turned on.

The second terminal of the first switching element Q1 is input by a data signal. Thus, when the first control signal controls the first switching element Q1 to be turned on, the data signal passes through the second terminal of said first switching element Q1 to be transmitted to the data line so that the LCD panel is achieved to display or to test the data line Dm of the LCD panel.

With the first discharge circuit 23 and the first switching element Q1 at the array manufacturing process stage, the accumulated negative charges on the data line are discharged. Further, in this embodiment, multiple fifth switching elements Q5 are further comprised. The fifth switching elements are mounted oppositely to the first switching elements Q1. Each fifth switching element Q5 corresponds to one data line Dm. The fifth switching elements Q5 are P-type thin-film transistors. A first terminal of the fifth switching element Q5 is connected to one data line Dm, a second terminal of the fifth switching element Q5 is connected to a ground line used as discharge circuit, and a control terminal of the fifth switching element Q5 is input by a ground voltage, i.e. the control terminal and the second terminal of the fifth switching element are both connected to the ground line. Therefore, during the array manufacturing stage, when the data line Dm accumulates too many positive static electricity i.e. the data line Dm accumulates much more positive charges until the voltage (positive voltage) is higher than the ground voltage, the gate voltage Vgs (gate voltage-source voltage) is smaller than zero and the fifth switching element Q5 is turned on. Then the voltage of the data line Dm is discharged through the ground line to achieve ESD protection.

Therefore, during the array manufacturing stage, when much more negative charges accumulated on the data line, the first switching element Q1 is turned on to discharge the negative charges on the data line through the first charge circuit 23. When much more positive charges accumulated on the data line, the fifth switching element Q5 is turned on to discharge the positive charges on the data line through the first charge circuit 23 to achieve ESD protection.

In this embodiment, with the first switching element used for driving the LCD panel to display to at least discharge the negative static electricity in the array manufacturing process to achieve ESD protection. Therefore, only a small space is needed to form the ESD protection structure for the positive static electricity. Then the panel space occupied by the ESD protection structure is reduced to be favorable for narrow frame design.

In another embodiment, the first switching elements may be P-type thin-film transistors. Then at the array manufacturing stage, when the data line Dm accumulates too many positive static electricity i.e. the data line Dm accumulates much more positive charges until the voltage (positive voltage) is higher than the first reference voltage, the gate voltage Vgs (gate voltage-source voltage) is smaller than zero and the first switching element Q1 is turned on. Then voltage of the data line Dm is discharged through the first discharge circuit 23 to achieve ESD protection. During the stage to drive the LCD panel to display or to test the LCD panel, the control terminals of the first switching elements are input by a first control signal. When the control terminals of the first switching element are input by a low voltage level, the first switching element is turned on and the data signal is input to the data line through the first switching element. Thus, the LCD panel is achieved to display or to be tested.

Figure 5:
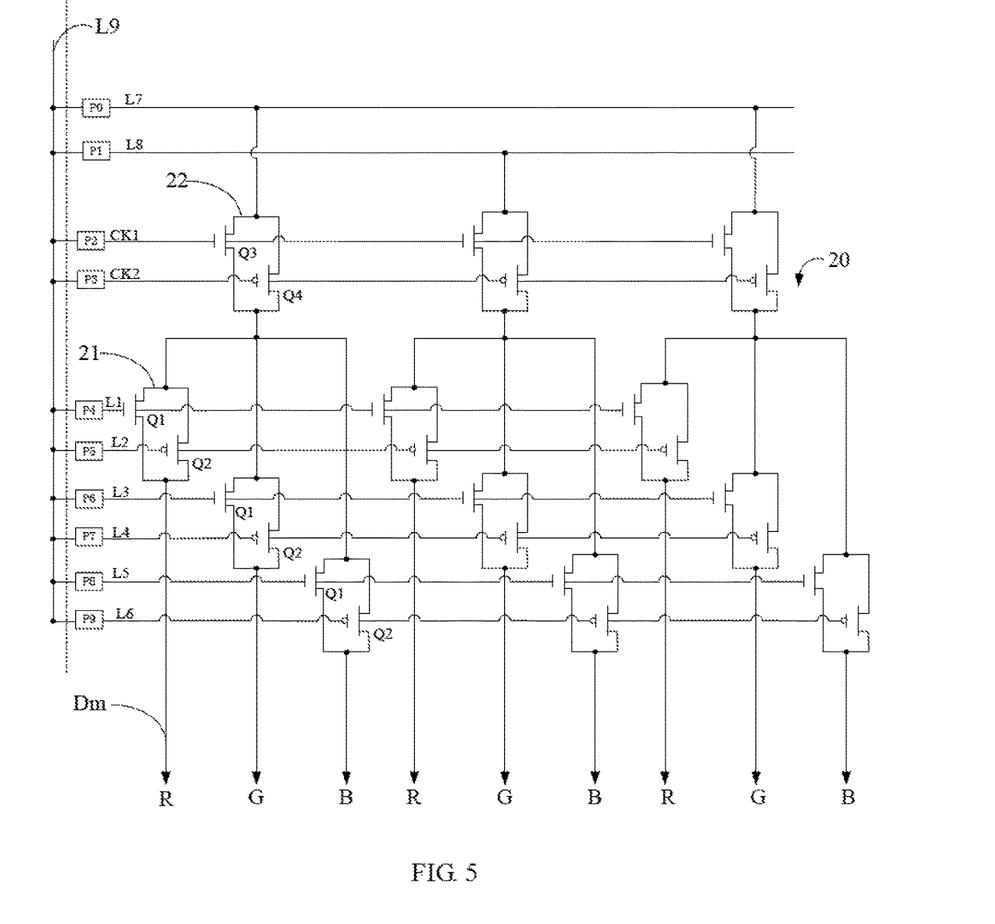
FIG. 5 is an illustrative view of another embodiment of a driving circuit of an LCD panel in accordance with the present invention.

With reference to FIG. 5, in another embodiment of the driving circuit of the LCD panel in accordance with the present invention, the panel space is further reduced. Specifically, as shown in FIG. 5, each first switching circuit 21 further has a second switching element Q2. The driving circuit 20 further comprises multiple second switching circuits 22, odd-pixel data signal input line L7, even-pixel data signal input line L8, clock lines CK1 and CK2 and control lines L2, L4, L6. The second switching circuit 22 has a third switching element Q3 and a fourth switching element Q4. Each second switching circuit 22 corresponds to three first switching circuits 21. The first switching element Q2, the third switching element Q3 and the fourth switching element Q4 respectively have a control terminal, a first terminal and a second terminal.

The first terminals of the first switching element Q1 and the second switching element Q2 of the same first switching circuit 21 are connected to the same data line of the LCD panel. The second terminals of the first switching element Q1 and the second switching element Q2 of the same are connected to each other. The first terminals of the third switching element Q3 and the fourth switching element Q4 of the same second switching circuit 22 are connected to each other. The second terminals of the first switching element Q1 and the second switching element Q2 of the same are connected to the first terminals of the third switching element Q3 and the fourth switching element Q4 of the corresponding second switching circuit 22. Then in this embodiment, the first terminals of the third switching element Q3 and the fourth switching element Q4 of one second switching circuit 22 are connected to the second terminals of the first switching element Q1 and the second switching element Q2 of the three corresponding first switching circuits 21. The switching circuits 21 respectively connect to a data line corresponding to the R sub-pixel column, a data line corresponding to the G sub-pixel column and a data line corresponding to B sub-pixel column. The second terminal of the third switching element Q3 and the fourth switching element Q4 of the same second switching circuit 22 are connected to each other and are connected to the data signal input line. Specifically, one first switching circuit 22 corresponds to one pixel unit. Thus the second terminals of the third switching element Q3 and the fourth switching element Q4 of the second switching circuit 22 corresponding to the odd pixel units are connected to the odd pixel data signal input line L7. The second terminals of the third switching element Q3 and the fourth switching element Q4 of the second switching circuit 22 corresponding to the even pixel units are connected to the even pixel data signal input line L8.

In addition, the control terminals of all of the third switching elements Q3 are connected to the clock line CK1. The control terminals of all of the fourth switching elements Q4 are connected to the clock line CK2. The control terminals of the first switching elements Q1 connecting the data lines corresponding to the R sub-pixel columns are connected to the control line L1. The control terminals of the second switching elements Q2 connecting the data lines corresponding to the R sub-pixel columns are connected to the control line L2. The control terminals of the first switching elements Q1 connecting the data lines corresponding to the G sub-pixel columns are connected to the control line L3. The control terminals of the second switching elements Q2 connecting the data lines corresponding to the G sub-pixel columns are connected to the control line L4. The control terminals of the first switching elements Q1 connecting the data lines corresponding to the B sub-pixel columns are connected to the control line L5. The control terminals of the second switching elements Q2 connecting the data lines corresponding to the B sub-pixel columns are connected to the control line L6.

The driving circuit 20 further comprises conductive pads P0~P9 used as port. The odd pixel data signal input line L7, the even pixel data signal input line L8, the clock lines CK1 and CK2, the control lines L1~L6 are respectively connected to the conductive pads P0~P9.

At the array manufacturing process stage, a short-circuit line L9 is formed on a side of the LCD panel. The control terminals of the first switching elements Q1 and the second switching elements Q2 are used respectively to be input by the first reference voltage and the second reference voltage. The second terminals of the first switching elements Q1 and the second switching elements Q2 are respectively connected to the first discharge circuit and a second discharge circuit. Specifically, the first reference voltage and the second voltage are ground voltage in this embodiment. The first discharge circuit and the second discharge circuit are short-circuit lines connected to the ground. Therefore, the control lines L1~L6 are connected to the short-circuit lines connected to the ground to input ground voltage as reference voltage to the control terminals of the first switching elements Q1 and the second switching elements Q2. The conductive pads P4~P9 are connected to the short-circuit line L9 through leads to connect the control lines L1~L6 and the short-circuit line L9.

The control terminals of the third switching elements Q3 and the fourth switching elements Q4 are used respectively to be input by the first reference voltage and the second reference voltage. Specifically, the clock lines CK1, CK2 are connected to the short-circuit line L9 connected to the ground to input the ground voltage to the control terminals of the third switching elements Q3 and the fourth switching elements Q4. The conductive pads P2~P3 are connected to the short-circuit line L9 through leads to connect the clock lines CK1, CK2 and the short-circuit line L9. The first switching element Q1 and the second switching element Q2 of the same first switching circuit 21 are connected to the short-circuit line L9 used as the first discharge circuit and the second discharge circuit. That is, the odd pixel data signal input line L7 and the even pixel data signal input line L8 are connected to the short-circuit line L9 to achieve to connect the first switching elements Q1 and the second switching elements Q2 respectively to the first discharge circuit and the second discharge circuit. The conductive pads P0~P1 are connected to the short-circuit line L9 through leads to achieve to connect the odd pixel data signal input line L7 and the even pixel data signal input line L8 and the short-circuit line L9.

Therefore, at the array manufacturing process stage, it is only needs to connect the conductive pads P0~P9 through the leads to the short-circuit line L9 connected to the ground to achieve the connection between said each switching elements with the discharge circuit and to achieve to input the reference voltage to the control terminal of each switching element.

In this embodiment, the first switching elements Q1 and the third switching elements Q3 are N-type transistors. The second switching elements Q2 and the fourth switching elements Q4 are P-type thin-film transistors. The gate, source and drain of each transistor are respectively regarded as the control terminal, the first terminal and the second terminal of each switching element.

Therefore, during the dry-etching process at the array manufacturing process stage, when one of the data lines Dm accumulates too many negative charges until the voltage of the data line Dm is lower than the ground reference voltage (the voltage of the data line is negative, the ground voltage is zero) i.e. the source voltage of the first switching element Q1 corresponding to the data line Dm smaller than the gate voltage of the same, the first switching element Q1 is turned on. Then the negative charges move to the first terminal of the corresponding third switching element Q3 so that the source voltage of the third switching element Q3 is smaller than the gate voltage of the same to turn on the third switching element Q3. Then the data line Dm are connected to the short-circuit line L9 through the corresponding first switching element Q1 and the corresponding third switching element Q3 in sequence so that the accumulated negative charges on the data line Dm are discharged through the short-circuit line L9. When one of the data lines Dm accumulates too many positive charges until the voltage of the data line Dm is higher than the ground reference voltage i.e. the source voltage of the second switching element Q2 corresponding to the data line Dm larger than the gate voltage of the same, the second switching element Q2 is turned on. Then the positive charges move to the first terminal of the corresponding fourth switching element Q4 so that the source voltage of the fourth switching element Q4 is larger than the gate voltage of the same to turn on the fourth switching element Q4. Then the data line Dm are connected to the short-circuit line L9 through the corresponding second switching element Q2 and the corresponding fourth switching element Q4 so that the accumulated positive charges on the data line Dm are discharged through the short-circuit line L9.

With the aforementioned method, the ESD protection at the array manufacturing process stage is achieved.

After the array manufacturing process, a cell manufacturing process is entered. The short-circuit line L9 is removed by cutting or rubbing edge process and may be removed by cutting along the dotted line shown in the figure so that the conductive pads P0~P9 are disconnected to each other. During the following manufacturing processes, the signals for display or test are input to the odd pixel data signal input line L7, the even pixel data signal input line L8, the clock lines CK1 and CK2, the control lines L1~L6 through the conductive pads P0~P9 to achieve to drive the data line at the stage to drive the LCD panel to display or to test the LCD panel. Specifically, when the cell manufacturing process is entered, the short-circuit line L9 is cut. When the LCD panel is driven to display or to test such as one of the data lines Dm needs to be input a data signal, the control terminal of at least one of the third switching elements Q3 and the fourth switching element Q4 of the corresponding second switching circuit 22 is input by a second control signal. For example, the second control signal is input to the control terminal of the third switching elements Q3 to control the third switching element Q3 to be turned on. Then the control terminal of at least one of the first switching elements Q1 and the second switching element Q2 of the corresponding first switching circuit 21 is input by a first control signal. For example, the first control signal is input to the control terminal of the first switching elements Q1 to control the first switching element Q1 to be turned on. Therefore, the data signal passes through said third switching element Q3 and said first switching element Q1 to be transmitted to the data line Dm. When the data signal does not need to be input to that data line Dm, the corresponding first switching element Q1 and the second switching element Q2 are turned off.

Figure 6:
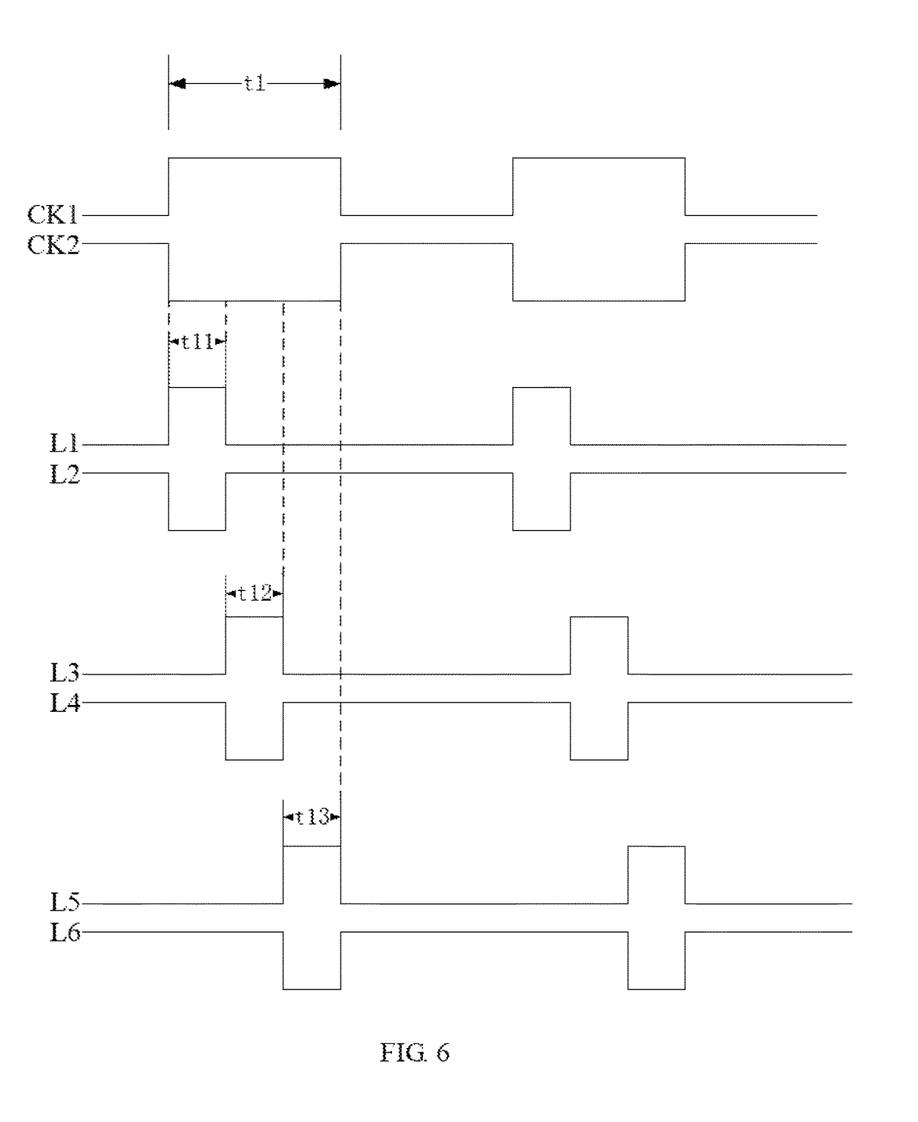
FIG. 6 is a time sequence waveform diagram of a first control signal and a second control signal of the driving circuit of an LCD panel in FIG. 5 at the stage to drive the LCD panel to display or to test the LCD panel.

Therefore, when the LCD panel is driven to display, data signals need to be input to each data line Dm individually. The waveform diagram is shown in FIG. 6 when the odd pixel data signal input line L7, the even pixel data signal input line L8, the clock lines CK1 and CK2, the control lines L1~L6 input the signal. Through the conductive pads P0 and P1, the data signal of the odd pixels and the data signal of even pixels are input to the odd pixel data signal input line L7, the even pixel data signal input line L8. At the time t1, the clock line CK1 is at the high voltage level and the clock line CK2 is at the low voltage level. It means that the second control signal input to the control terminal of the third switching element Q3 of one of the second switching circuit 22 is at the high voltage level, and the second control signal input to the control terminal of the fourth switching element Q4 is at the low voltage level. Then the third switching element Q3 and the fourth switching element Q4 are turned on. At the time t11, the control line L1 is at the high voltage level and the control line L2 is at the low voltage level. It means that the first control signal input to the control terminal of the first switching element Q1 connecting to the data line corresponding to the R sub-pixel column is at the high voltage level, and the first control signal input to the control terminal of the second switching element Q2 connecting to the data line corresponding to the R sub-pixel column is at the low voltage level. Then the first switching element Q1 and the second switching element Q2 are turned on so that the data signal can be input to the data line corresponding to the R sub-pixel column. At the time t12, the first switching element Q1 and the second switching element Q2 connecting to the data line corresponding to the R sub-pixel column are turned off. The first switching element Q1 and the second switching element Q2 connecting to the data line corresponding to the G sub-pixel column are turned on. Therefore, the data signal is able to be input to the data line corresponding to the G sub-pixel column. At the time t13, the first switching element Q1 and the second switching element Q2 connecting to the data line corresponding to the G sub-pixel column are turned off. The first switching element Q1 and the second switching element Q2 connecting to the data line corresponding to the B sub-pixel column are turned on. Therefore, the data signal is able to be input to the data line corresponding to the B sub-pixel column.

With the aforementioned method, the data signals for display or test are able to be input to each data line.

A person skilled in the art can understand that during the aforementioned process to drive the LCD panel, only inputting the second control signal to one of the clock line is possible, and only inputting the first control signal to the control lines L1, L3 and L5 or only inputting the first control signal to the control lines L2, L4 and L6 is also possible. For one data line, when the data line needs to be input a data signal, it only needs to turn on one of the switching element of the corresponding first switching circuit 21. When the data line does not need to be input a data signal, it needs to turn off both switching elements of the corresponding first switching circuit 21.

With the driving circuit of this embodiment, one second switching circuit 22 corresponds to three first switching circuits 21, i.e. three lines are led out from one second switching circuit 22 to be input data signals through three data lines of three first switching circuits 21. Therefore, only one data IC is needed to input the data signal to the three data lines, but not using one data IC to input data signal to one data line. Thus, the IC cost is saved. Certainly, in other embodiments, each data IC may accordingly input data signal to two data lines, four data lines, six data lines or even more data lines.

In this embodiment, the first switching circuit 21 comprising the first switching element Q1 and the second switching element Q2 can not only achieve to drive the LCD panel to display, but also achieve the negative static electricity discharge and the positive static electricity discharge of the data line at the array manufacturing process stage. Then extra panel space is not needed to form the ESD protection structure. Then the panel space is reduced to be favorable for narrow frame design.

In another embodiment in accordance with the present invention, a first reference voltage and the second reference voltage may be different. For example, the first reference voltage may be −1 v, −3 v or +2 v, and the second reference voltage may be +1 v or +4 v. In addition, the first switching element and the third switching element may further be N-type triodes or Darlington transistors, or combined by multiple thin-film transistors equivalent to N-type thin-film transistors. The second switching element and the fourth switching element may further be P-type triode or Darlington transistors, or combined by multiple thin-film transistors equivalent to P-type thin-film transistors.

In the embodiment of the driving circuit in accordance with the present invention, the second switching circuit may not be mounted. Then the second terminals of the first switching element Q1 and the second switching element Q2 of the first switching circuit may be connected to different first discharge circuit and the second discharge circuit. For example, the first discharge circuit may be a ground resistance or leads with positive charges, and the second discharge circuit may be leads with negative charges.

The present invention also provides an embodiment of the LCD panel comprises a driving circuit of any one of the pre-described embodiments. The LCD panel may be a low temperature poly-silicon LCD panel and of course may be a non-poly-silicon LCD panel.

Figure 7:
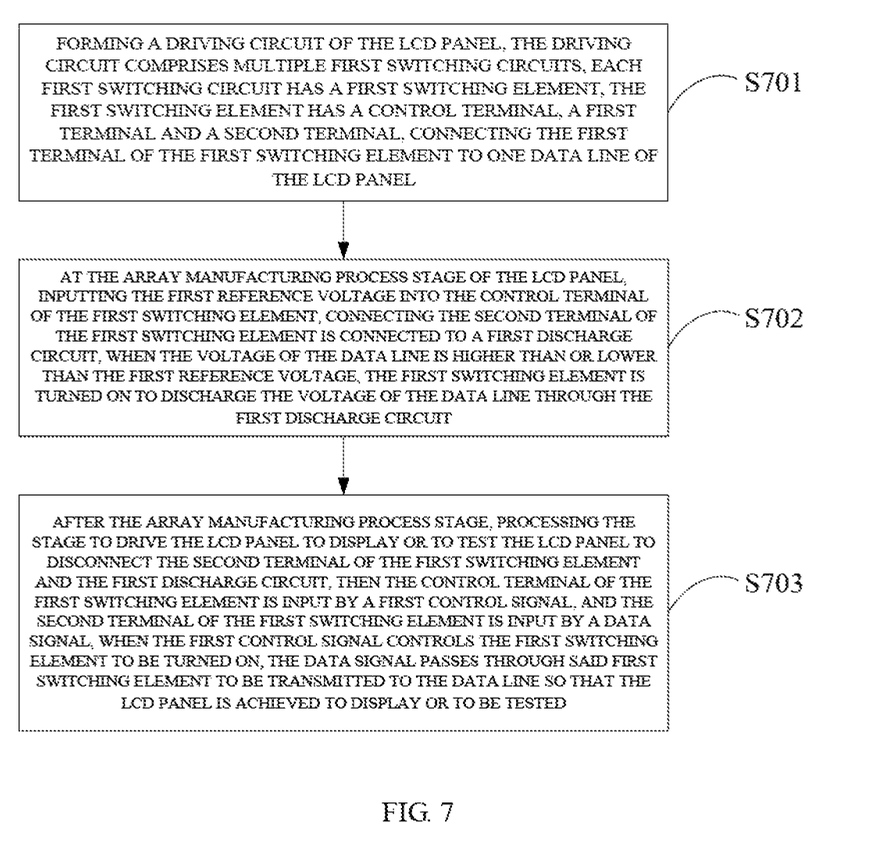
FIG. 7 is a flow chart of an embodiment of a manufacturing method of an LCD panel in accordance with the present invention.

With reference to FIG. 7, an embodiment of a method for manufacturing the LCD panel in accordance with the present invention to manufacturing the described LCD panel with the driving circuit as shown in the pre-described embodiments comprises following step:

Step S701: A driving circuit of the LCD panel is formed. The driving circuit comprises multiple first switching circuits. Each first switching circuit has a first switching element. The first switching element has a control terminal, a first terminal and a second terminal. The first terminal of the first switching element is connected to one data line of the LCD panel.

With reference to FIG. 2, in this embodiment, when the driving circuit 20 is formed, three control lines L1, L3, L5 are also formed while the first switching element Q1 is formed. The first terminal of the first switching element Q1 connects to one data line Dm of the LCD panel, i.e. each data line Dm corresponding to one first switching element Q1. The control terminals of the first switching elements Q1 corresponding to the R sub-pixel columns connect to the control line L1. The control terminals of the first switching elements Q1 corresponding to the G sub-pixel columns connect to the control line L3. The control terminals of the first switching elements Q1 corresponding to the B sub-pixel columns connect to the control line L5.

Step S702: At the array manufacturing process stage of the LCD panel, the first reference voltage is input into the control terminal of the first switching element. The second terminal of the first switching element is connected to a first discharge circuit. When the voltage of the data line is higher than or lower than the first reference voltage, the first switching element is turned on to discharge the voltage of the data line through the first discharge circuit.

In this embodiment, the first switching element Q1 is an N-type field effect transistor. The control terminal, the first terminal and the second terminal respectively correspond to the gate, source and drain of the N-type field effect transistor.

With further reference to FIG. 2, at array manufacturing process stage, the control terminals of the first switching elements Q1 of the first switching circuits 21 are used to be input by a first reference voltage. The first reference voltage is input through the three control lines L1, L3, L5 to the control terminals of the first switching elements Q1. The second terminal of the first switching element Q1 is connected to a first discharge circuit 23. Therefore, during the dry-etching process at the array manufacturing process stage, when the data line Dm accumulates a large amount of negative static electricity i.e. the data line Dm accumulates much more negative charges until the voltage (negative voltage) of the data line Dm is lower than the first reference voltage, the gate voltage Vgs (gate voltage-source voltage) is larger than zero and the first switching element Q1 is turned on. Then the data line Dm and the first discharge circuit 23 are connected so that the accumulated negative charges on the data line Dm are discharged through the first discharge circuit 23 to achieve ESD protection. The first discharge circuit 23 may be a ground resistance, a ground line or a lead with positive charges.

Step S703: After the array manufacturing process stage, the stage to drive the LCD panel to display or to test the LCD panel is processed to disconnect the second terminal of the first switching element and the first discharge circuit. Then the control terminal of the first switching element is input by a first control signal, and the second terminal of the first switching element is input by a data signal. Thus, when the first control signal controls the first switching element to be turned on, the data signal passes through said first switching element to be transmitted to the data line so that the LCD panel is achieved to display or to be tested.

With further reference to FIG. 3, after the array manufacturing process, a cell manufacturing process is entered. At the cell manufacturing process stage, the LCD panel is usually driven or tested. However, the static electricity is not easily accumulated on the data line Dm at this stage so that the data line needs not to be proceed ESD protection. Therefore, the second terminal of the first switching element Q1 and the first discharge circuit 23 can be disconnected and the control terminals of the first switching elements Q1 are input by a first control signal. Specifically, the first control signal is input to the control terminals of the first switching elements Q1 through the control lines L1, L3, L5 to respectively control the corresponding first switching element Q1 to be turned on or off. In addition, the data signal is input to the second terminal of the first switching element Q1. Therefore, when the first control signal controls the first switching element Q1 to be turned on, the data signal is input to the second terminal of the first switching element Q1 and passes through the first switching element Q1 to the corresponding data line Dm. Therefore, the LCD panel is achieved to be driven to display, or to test the data line Dm of the LCD panel.

In this embodiment, with the first switching element used for driving the LCD panel to display to at least discharge the negative static electricity in the array manufacturing process to achieve ESD protection. Therefore, only a small space is needed to form the ESD protection structure for the positive static electricity. Then the panel space occupied by the ESD protection structure is reduced to be favorable for narrow frame design.

In another manufacturing method in accordance with the present invention with further reference to FIG. 5, in the step to form the driving circuit of the LCD panel, a second switching element Q2, multiple second switching circuits 22, odd-pixel data signal input line L7, even-pixel data signal input line L8, clock lines CK1 and CK2 and control lines L2, L4, L6 are also formed while the first switching element Q1 is formed. The second switching circuit 22 has a third switching element Q3 and a fourth switching element Q4. Each second switching circuit 22 corresponds to three first switching circuits 21. The first switching element Q2, the third switching element Q3 and the fourth switching element Q4 respectively have a control terminal, a first terminal and a second terminal.

The first terminals of the first switching element Q1 and the second switching element Q2 of the same first switching circuit 21 are connected to the same data line of the LCD panel. The second terminals of the first switching element Q1 and the second switching element Q2 of the same are connected to each other. The first terminals of the third switching element Q3 and the fourth switching element Q4 of the same second switching circuit 22 are connected to each other. The second terminals of the first switching element Q1 and the second switching element Q2 of the same are connected to the first terminals of the third switching element Q3 and the fourth switching element Q4 of the corresponding second switching circuit 22. Then in this embodiment, the first terminals of the third switching element Q3 and the fourth switching element Q4 of one second switching circuit 22 are connected to the second terminals of the first switching element Q1 and the second switching element Q2 of the three corresponding first switching circuits 21. The three switching circuits 21 respectively connect to a data line corresponding to the R sub-pixel column, a data line corresponding to the G sub-pixel column and a data line corresponding to B sub-pixel column. The second terminal of the third switching element Q3 and the fourth switching element Q4 of the same second switching circuit 22 are connected to each other and are connected to the data signal input line. Specifically, one first switching circuit 22 corresponds to one pixel unit. Thus the second terminals of the third switching element Q3 and the fourth switching element Q4 of the second switching circuit 22 corresponding to the odd pixel units are connected to the odd pixel data signal input line L7. The second terminals of the third switching element Q3 and the fourth switching element Q4 of the second switching circuit 22 corresponding to the even pixel units are connected to the even pixel data signal input line L8.

In addition, the control terminals of all of the third switching elements Q3 are connected to the clock line CK1. The control terminals of all of the fourth switching elements Q4 are connected to the clock line CK2. The control terminals of the first switching elements Q1 connecting the data lines corresponding to the R sub-pixel columns are connected to the control line L1. The control terminals of the second switching elements Q2 connecting the data lines corresponding to the R sub-pixel columns are connected to the control line L2. The control terminals of the first switching elements Q1 connecting the data lines corresponding to the G sub-pixel columns are connected to the control line L3. The control terminals of the second switching elements Q2 connecting the data lines corresponding to the G sub-pixel columns are connected to the control line L4. The control terminals of the first switching elements Q1 connecting the data lines corresponding to the B sub-pixel columns are connected to the control line L5. The control terminals of the second switching elements Q2 connecting the data lines corresponding to the B sub-pixel columns are connected to the control line L6.

The driving circuit 20 further comprises conductive pads P0~P9 used as port. The odd pixel data signal input line L7, the even pixel data signal input line L8, the clock lines CK1 and CK2, the control lines L1~L6 are respectively connected to the conductive pads P0~P9.

At the array manufacturing process stage of the LCD panel, a short-circuit line L9 is formed on a side of the LCD panel.

At the array manufacturing process stage, the control terminals of the first switching elements Q1 and the second switching elements Q2 are used respectively to be input by the first reference voltage and the second reference voltage. The second terminals of the first switching elements Q1 and the second switching elements Q2 are respectively connected to the first discharge circuit and a second discharge circuit. Specifically, the first reference voltage and the second voltage are ground voltage in this embodiment. The first discharge circuit and the second discharge circuit are short-circuit lines L9 connected to the ground. Therefore, the control lines L1~L6 are connected to the short-circuit lines L9 connected to the ground to input ground voltage as the reference voltage to the control terminals of the first switching elements Q1 and the second switching elements Q2. The conductive pads P4~P9 are connected to the short-circuit line L9 through leads to connect the control lines L1~L6 and the short-circuit line L9.

In addition, the control terminals of the third switching elements Q3 and the fourth switching elements Q4 are used respectively to be input by the first reference voltage and the second reference voltage. Specifically, the clock lines CK1, CK2 are connected to the short-circuit line L9 connected to the ground to input the ground voltage to the control terminals of the third switching elements Q3 and the fourth switching elements Q4. The conductive pads P2~P3 are connected to the short-circuit line L9 through leads to connect the clock lines CK1, CK2 and the short-circuit line L9. The first switching element Q1 and the second switching element Q2 of the same first switching circuit 21 are connected to the short-circuit line L9 used as the first discharge circuit and the second discharge circuit. That is, the odd pixel data signal input line L7 and the even pixel data signal input line L8 are connected to the short-circuit line L9 to achieve to connect the first switching elements Q1 and the second switching elements Q2 respectively to the first discharge circuit and the second discharge circuit. The conductive pads P0~P1 are connected to the short-circuit line L9 through leads to achieve to connect the odd pixel data signal input line L7 and the even pixel data signal input line L8 and the short-circuit line L9.

In this embodiment, the first switching elements Q1 and the third switching elements Q3 are N-type thin-film transistors. The second switching elements Q2 and the fourth switching elements Q4 are P-type thin-film transistors. The gate, source and drain of each transistor are respectively regarded as the control terminal, the first terminal and the second terminal of each switching element.

Therefore, during the dry-etching process at the array manufacturing process stage, when one of the data lines Dm accumulates too many negative charges until the voltage of the data line Dm is lower than the ground reference voltage (the voltage of the data line is negative, the ground voltage is zero) i.e. the source voltage of the first switching element Q1 corresponding to the data line Dm smaller than the gate voltage of the same, the first switching element Q1 is turned on. Then the negative charges move to the first terminal of the corresponding third switching element Q3 so that the source voltage of the third switching element Q3 is smaller than the gate voltage of the same to turn on the third switching element Q3. Then the data line Dm are connected to the short-circuit line L9 through the corresponding first switching element Q1 and the corresponding third switching element Q3 in sequence so that the accumulated negative charges on the data line Dm are discharged through the short-circuit line L9. When one of the data lines Dm accumulates too many positive charges until the voltage of the data line Dm is higher than the ground reference voltage i.e. the source voltage of the second switching element Q2 corresponding to the data line Dm larger than the gate voltage of the same, the second switching element Q2 is turned on. Then the positive charges move to the first terminal of the corresponding fourth switching element Q4 so that the source voltage of the fourth switching element Q4 is larger than the gate voltage of the same to turn on the fourth switching element Q4. Then the data line Dm are connected to the short-circuit line L9 through the corresponding second switching element Q2 and the corresponding fourth switching element Q4 so that the accumulated positive charges on the data line Dm are discharged through the short-circuit line L9.

After the array manufacturing process, a following manufacturing process is entered. The short-circuit line L9 is removed by cutting or rubbing edge process and may be removed by cutting along the dotted line shown in the figure so that the conductive pads P0~P9 are disconnected to each other. During the following manufacturing processes, the signals for display or test are input to the odd pixel data signal input line L7, the even pixel data signal input line L8, the clock lines CK1 and CK2, the control lines L1~L6 through the conductive pads P0~P9 to achieve to drive the data line at the stage to drive the LCD panel to display or to test the LCD panel. Specifically, when the cell manufacturing process is entered, the short-circuit line L9 is cut. When the LCD panel is driven to display or to test such as one of the data lines Dm needs to be input a data signal, the control terminal of at least one of the third switching elements Q3 and the fourth switching element Q4 of the corresponding second switching circuit 22 is input by a second control signal. For example, the second control signal is input to the control terminal of the third switching elements Q3 to control the third switching element Q3 to be turned on. Then the control terminal of at least one of the first switching elements Q1 and the second switching element Q2 of the corresponding first switching circuit 21 is input by a first control signal. For example, the first control signal is input to the control terminal of the first switching elements Q1 to control the first switching element Q1 to be turned on. Therefore, the data signal passes through said third switching element Q3 and said first switching element Q1 to be transmitted to the data line Dm. When the data signal does not need to be input to that data line Dm, the corresponding first switching element Q1 and the second switching element Q2 are turned off.

Therefore, when the LCD panel is driven to display, data signals need to be input to each data line Dm individually. The waveform diagram is shown in FIG. 6 when the odd pixel data signal input line L7, the even pixel data signal input line L8, the clock lines CK1 and CK2, the control lines L1~L6 input the signal. Through the conductive pads P0 and P1, the data signal of the odd pixels and the data signal of even pixels are input to the odd pixel data signal input line L7, the even pixel data signal input line L8. At the time t1, the clock line CK1 is at the high voltage level and the clock line CK2 is at the low voltage level. It means that the second control signal input to the control terminal of the third switching element Q3 of one of the second switching circuit 22 is at the high voltage level, and the second control signal input to the control terminal of the fourth switching element Q4 is at the low voltage level. Then the third switching element Q3 and the fourth switching element Q4 are turned on. At the time t11, the control line L1 is at the high voltage level and the control line L2 is at the low voltage level. It means that the first control signal input to the control terminal of the first switching element Q1 connecting to the data line corresponding to the R sub-pixel column is at the high voltage level, and the first control signal input to the control terminal of the second switching element Q2 connecting to the data line corresponding to the R sub-pixel column is at the low voltage level. Then the first switching element Q1 and the second switching element Q2 are turned on so that the data signal can be input to the data line corresponding to the R sub-pixel column. At the time t12, the first switching element Q1 and the second switching element Q2 connecting to the data line corresponding to the R sub-pixel column are turned off. The first switching element Q1 and the second switching element Q2 connecting to the data line corresponding to the G sub-pixel column are turned on. Therefore, the data signal is able to be input to the data line corresponding to the G sub-pixel column. At the time t13, the first switching element Q1 and the second switching element Q2 connecting to the data line corresponding to the G sub-pixel column are turned off. The first switching element Q1 and the second switching element Q2 connecting to the data line corresponding to the B sub-pixel column are turned on. Therefore, the data signal is able to be input to the data line corresponding to the B sub-pixel column.

With the aforementioned method, the data signals for display or test are able to be input to each data line.

In the manufacturing method of this embodiment, the first switching element Q1 can not only achieve to drive the LCD panel to display, but also achieves the negative static electricity discharge and the positive static electricity discharge of the data line at the array manufacturing process stage. Then extra panel space while designing the panel is not needed to form the ESD protection structure. Then the panel space is reduced to be favorable for narrow frame design.

The foregoing description is only embodiments of the present invention and does not limit the patent scope of the present invention. The equivalent structures and equivalent procedures made according to the description and the figures of the present invention, or directly or indirectly used in other related technical filed, is therefore included within the scope of patent protection in the present invention.

What is claimed is:

1. A manufacturing method of an LCD panel comprising steps of:

forming a driving circuit of the LCD panel, wherein the driving circuit comprises multiple first switching circuits; each first switching circuit has a first switching element; the first switching element has a control terminal, a first terminal and a second terminal; the first terminal of the first switching element is connected to one data line of the LCD panel;

at an array manufacturing process stage of the LCD panel, inputting a first reference voltage into the control terminal of the first switching element; connecting the second terminal of the first switching element to a first discharge circuit to discharge the voltage of the data line through the first discharge circuit when the voltage of the data line is higher than or lower than the first reference voltage and the first switching element is turned on; and after the array manufacturing process stage, processing the stage to drive the LCD panel to display or to test the LCD panel to disconnect the second terminal of the first switching element and the first discharge circuit; inputting a first control signal to the control terminal of the first switching element; inputting a data signal to the second terminal of the first switching element to transmitting the data signal through said first switching element to the data line when the first control signal controls the first switching element to be turned on and to achieve the LCD panel to display or to be tested.

2. The manufacturing method according to claim 1, wherein forming the driving circuit of the LCD panel further comprises steps of:

forming the driving circuit of the LCD panel, wherein the driving circuit has multiple second switching elements; the second switching element has a control terminal, a first terminal and a second terminal; the first terminals of the first switching element and the second switching element are connected to the same data line of the LCD panel;

at the array manufacturing process stage of the LCD panel further comprises steps of: inputting a second reference voltage to the control terminal of the second switching element; connecting the second terminal of the second switching element to a second discharge circuit to discharge the voltage of the data line through the second discharge circuit when the voltage of the data line is higher than the second reference voltage and the second switching element is turned on, wherein when the voltage of the data line is lower than the first reference voltage, the first switching element is turned on; and after the array manufacturing process stage, at the stage to drive the LCD panel to display or to test the LCD panel further comprises steps of: disconnecting the first switching element and the second switching element respectively to the first discharge circuit and the second discharge circuit; inputting a first control signal to the control terminal of at least one of the first switching element and the second switching element, and inputting a data signal to the second terminal of at least one of the first switching element and the second switching element to achieve the LCD panel to display.

3. The manufacturing method according to claim 2, wherein forming the driving circuit of the LCD panel further comprises steps of:

forming the driving circuit of the LCD panel, wherein the driving circuit further has multiple second switching circuits; each second switching circuit has a third switching element and a fourth switching element; each second switching circuit corresponds to at least two of the first switching circuits; the second terminals of the first switching element of the at least two of the first switching circuits are connected to the first discharge circuit or to receive the data signal through the third switching element; the second terminals of the second switching element of the at least two of the first switching circuits are connected to the second discharge circuit or to receive the data signal through the fourth switching element; the third switching element and fourth switching element respectively have a control terminal, a first terminal and a second terminal; the first terminal of the third switching element is connected to the second terminals of the first switching elements of the corresponding at least two of the first switching circuits; the first terminal of the fourth switching element is connected to the second terminals of the second switching elements of the corresponding at least two of the first switching circuits;

at the array manufacturing process stage of the LCD panel further comprises steps of: respectively inputting the first reference voltage and the second reference voltage to the control terminals of the third switching element and the fourth switching element; respectively connecting the first terminals of the third switching element and the fourth switching element to the first discharge circuit and the second discharge circuit; when the voltage of the data line connected by one of the corresponding first switching circuits is lower than the first reference voltage, the third switching element is turned on to discharge the voltage of the data line connected by the one of the corresponding first switching circuits through the first discharge circuit; when the voltage of the data line connected by one of the corresponding first switching circuits is higher than the second reference voltage, the fourth switching element is turned on to discharge the voltage of the data line connected by one of the corresponding first switching circuits through the second discharge circuit; and after the array manufacturing process stage, at the stage to drive the LCD panel to display or to test the LCD panel further comprises steps of: inputting a second control signal to the control terminal of at least one of the third switching element and the fourth switching element, and inputting the data signal to the second terminal of at least one of the third switching element and the fourth switching element; the data signal is input to the second terminal of at least one of the first switching element and the second switching element of the at least two of the first switching circuits.

4. The manufacturing method according to claim 3, wherein the first reference voltage and the second voltage are ground voltage; the first discharge circuit and the second discharge circuit are short-circuit lines connected to the ground;

wherein at the array manufacturing process stage of the LCD panel further comprises steps of: connecting all the control terminals of the first switching elements, the second switching elements, the third switching elements and the fourth switching elements to the short-circuit lines; the first terminals of the third switching element and the fourth switching element of each second switching circuit are connected to the second terminals of the first switching elements and the second switching elements of the corresponding at least two of the first switching circuits; and after the array manufacturing process stage, at the stage to drive the LCD panel to display or to test the LCD panel further comprises steps of: the short-circuit lines are cut; then the first control signal is input to the control terminal of at least one of the first switching element and the second switching element of each first switching circuit; the second control signal is input to the control terminal of at least one of the third switching element and the fourth switching element of each second switching circuit; the data signal is input to the second terminal of at least one of the third switching element and the fourth switching element of each second switching circuit.

5. The manufacturing method according to claim 4, wherein the first switching elements and the third switching elements are N-type thin-film transistors; the second switching elements and the fourth switching elements are P-type thin-film transistors; the gate, source and drain are respectively regarded as the control terminal, the first terminal and the second terminal of each switching element.

* * * * *